United States Patent [19]

Andersson

[11] 3,996,644
[45] Dec. 14, 1976

[54] DEVICE FOR RENDERING PIGS UNCONSCIOUS IN AN AUTOMATIC MANNER

[76] Inventor: Gustav Valfrid Andersson, Dingevall, S-450 53 Hallevadsholm, Sweden

[22] Filed: Dec. 9, 1975

[21] Appl. No.: 639,106

[30] Foreign Application Priority Data

Dec. 10, 1974 Sweden .............................. 7415432

[52] U.S. Cl. .................................. 17/1 A; 17/1 E
[51] Int. Cl.$^2$ ......................................... A22B 3/06
[58] Field of Search .......................... 17/1 A, 1 E

[56] References Cited

UNITED STATES PATENTS

| 904,089 | 11/1908 | Shaw | 17/1 A |
|---|---|---|---|
| 3,081,483 | 3/1963 | Hughes | 17/1 A |
| 3,703,743 | 11/1972 | Schmidt | 17/1 A |

FOREIGN PATENTS OR APPLICATIONS 1,152,606  5/1969  United Kingdom ................. 17/1 A Primary Examiner—John F. Pitrelli
Attorney, Agent, or Firm—Robert E. Burns; Emmanuel J. Lobato; Bruce L. Adams

[57] ABSTRACT

A device for rendering pigs unconscious in an automatic manner comprising a chamber holding one pig at a time, and a conical member arranged to move towards and away from the pig's head and provided with two electrodes whereby an electric current is allowed to flow through the pig's head over a chosen period of time, thus rendering the pig unconscious, said funnel cooperating with a sensor which upon retracting of the funnel from the head of the unconscious pig actuates a trap door through which the pig is removed from said chamber.

3 Claims, 4 Drawing Figures

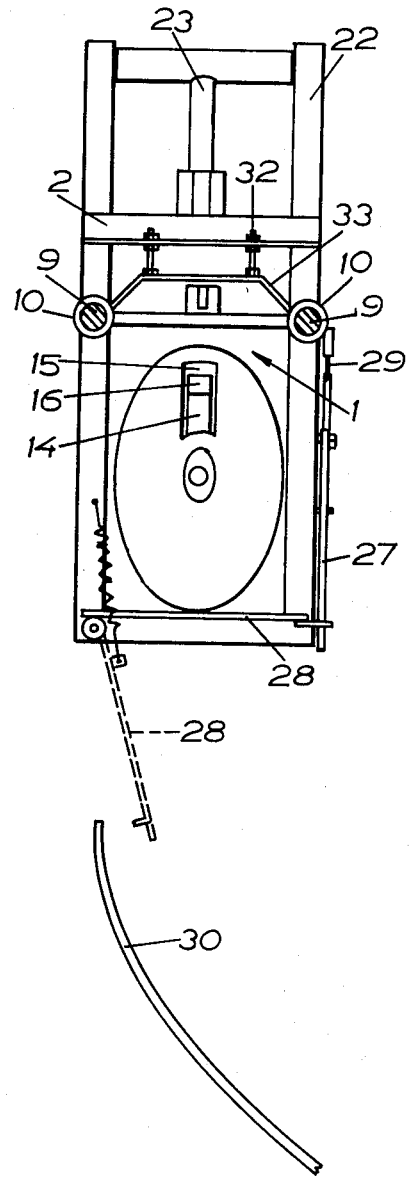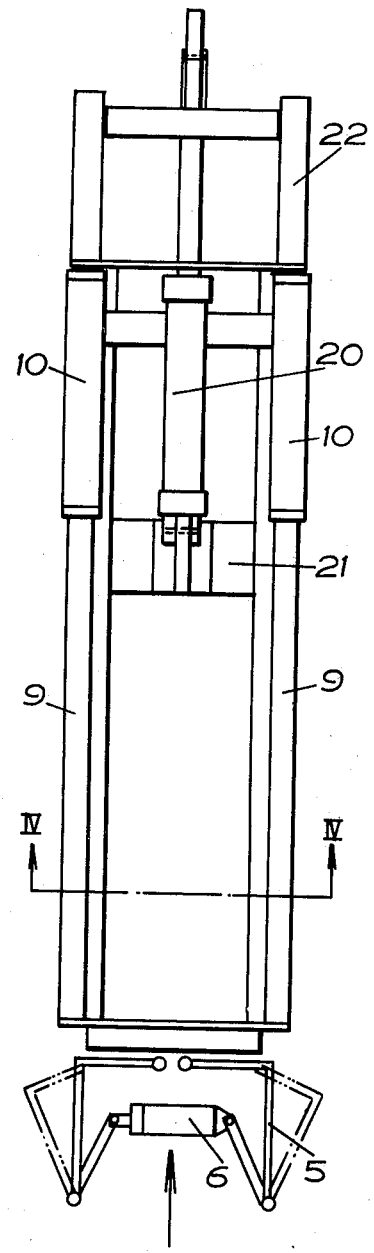

DEVICE FOR RENDERING PIGS UNCONSCIOUS IN AN AUTOMATIC MANNER

BACKGROUND OF THE INVENTION

The present invention concerns a device conceived to render pigs unconscious in an automatic manner and including a chamber holding one pig at a time.

When pigs are slaughtered they must be rendered uncounscious in some way before they are killed. Various methods are possible for this purpose. Gas or electricity is generally used. The use of gas is not completely without risks to the persons administering it and in addition, the pigs are frightened when they enter the room where they are made unconscious. This has a negative effect on the quality of the meat. Electric anaesthetics are generally administered by means of a pair of tongs each jaw of which is equipped with a live electrode. The tongs are applied manually across the head of the pig, whereby current flows between the electrodes and through the head of the pig, rendering the pig unconscious. This method works well, provided the pair of tongs is applied in a correct manner and the time during which the current is allowed to flow between the electrodes is correctly chosen. However, in practice the tongs are often applied carelessly, in a position askew and obliquely on the pig's head, and under unlucky circumstances the electrodes may be positioned on the ears of the pig, in which case the ears to some extent act as insulators with the result that the pig will not become unconscious at all or not sufficiently so. In addition, the accurate duration of the activation of the electric current is not always observed and often the pig is not made satisfactorily unconscious for this reason.

SUMMARY OF THE INVENTION

By using the device in accordance with the present invention each pig that enters into the anaesthetizing chamber is made completely unconscious by electric means. More precisely the device in accordance with the invention comprises a chamber arranged to hold one pig at a time and which has a closable opening through which the pigs are entered and a closable exit through which the pig leaves the chamber. The device is characterised by a conical funnel which is arranged for displacement towards and away from the head of the pig, the displacement towards the pig's head being effected when the pig entrance opening is being closed, and which is provided with a sensor means including an electrode which is energized upon its contact with the pig's head and arranged to bring a second live electrode mounted on the conical funnel into contact with the pig's head, whereby the pig is rendered unconscious, said conical funnel arranged to be retracted from the pig's head when a certain time period has lapsed and with the aid of means to effect opening of the exit to remove the pig from the chamber.

Further characteristics of the invention will become apparent upon reading of the appended claims.

BRIEF DESCRIPTION OF THE DRAWINGS

The advantages gained by the subject invention will appear from the following detailed description of a preferred embodiment illustrated in the appended, partly diagrammatical drawings, wherein FIG. 3 shows the device from above, some details having been omitted for more clarity, and FIG. 4 is a cross-sectional view along line IV—IV of FIG. 3 showing the exit in open position.

DETAILED DESCRIPTION OF A PREFERRED EMBODIMENT

Figure 1:
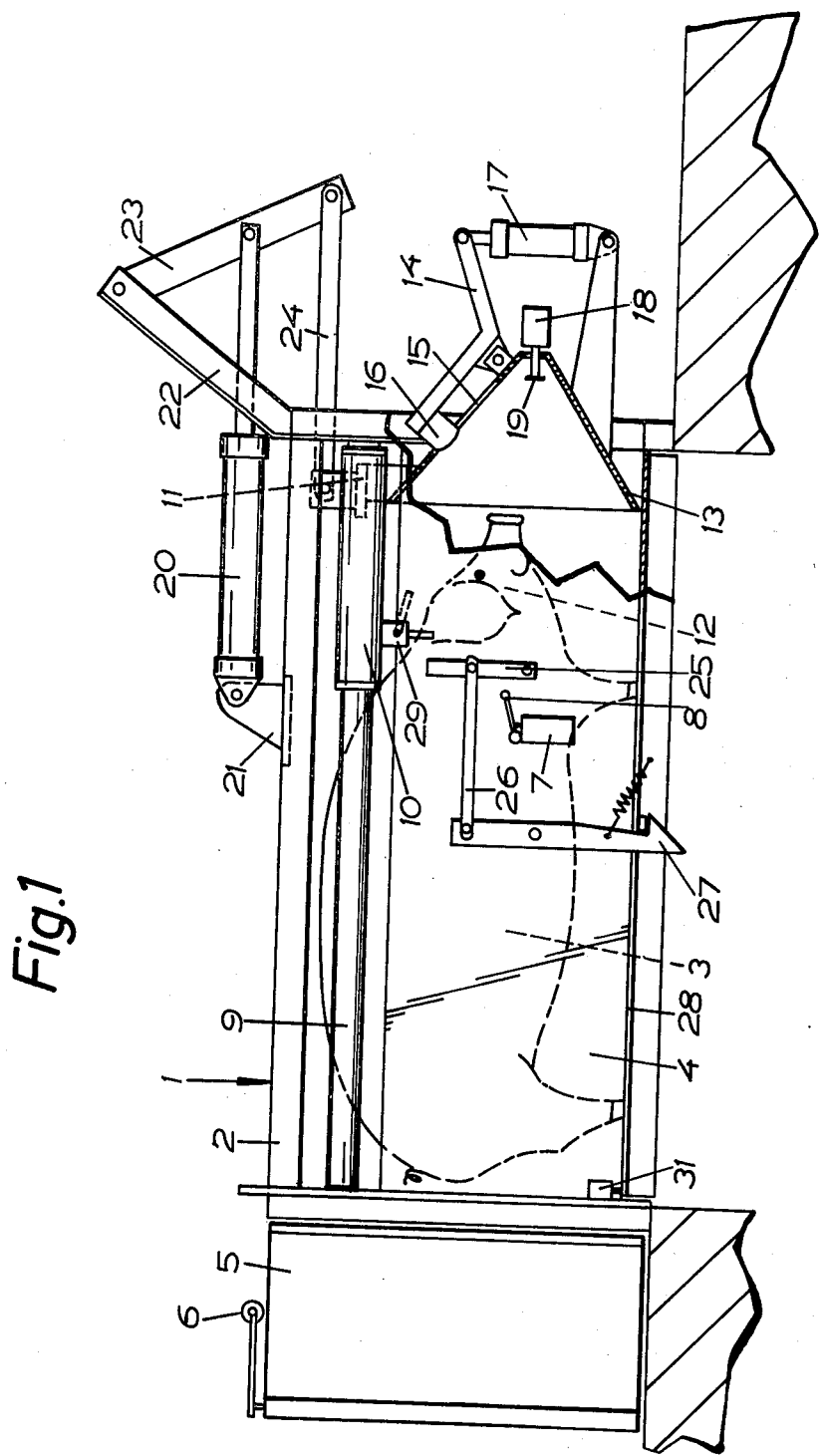
FIG. 1 is a side view, shown partly in a longitudinal sectional view, of a device in accordance with the invention in the initial position, when a pig has just been entered into the chamber.
Figure 2:
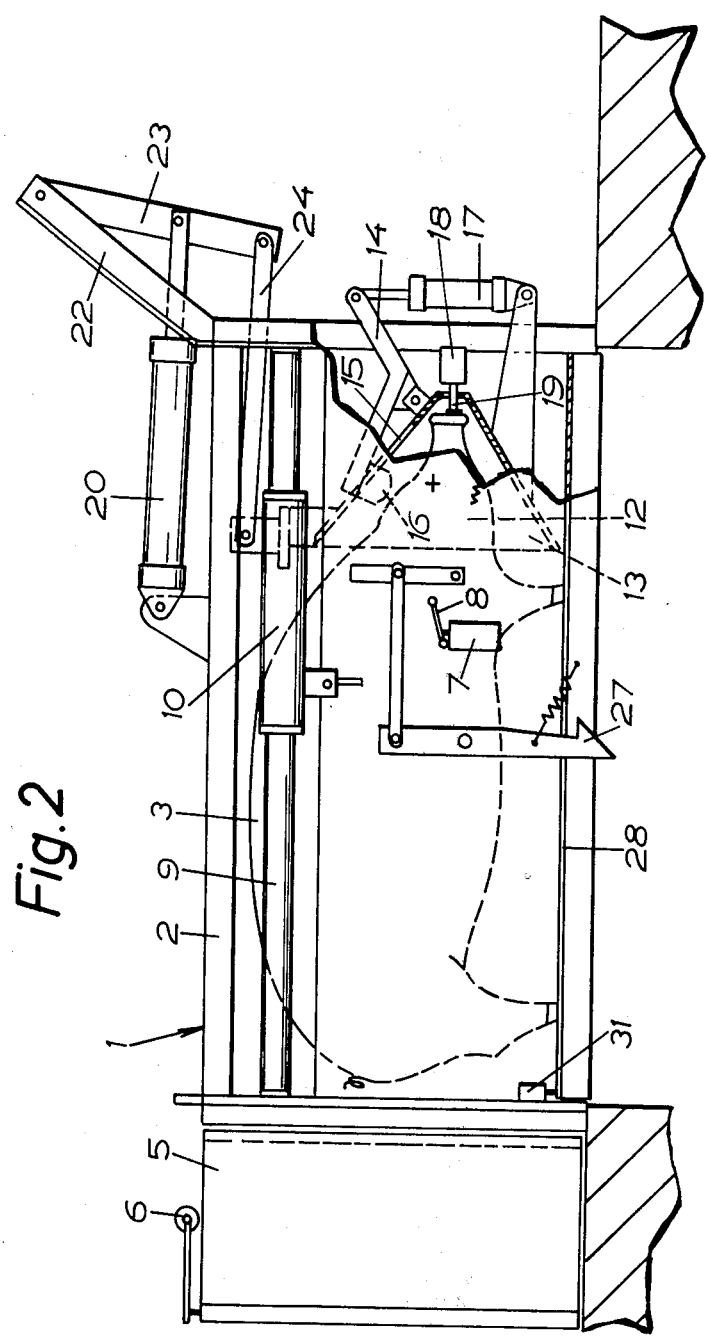
FIG. 2 is a side view similar to the one in FIG. 1 but showing the device in its operative (unconscious-rendering) position.

The device illustrated in FIGS. 1 to 4 for rendering pigs unconscious in accordance with the subject invention comprises a chamber 1 adapted to hold one pig at a time. The chamber is built around a framework 2 having a square-angled parallelepipedon configuration and sufficient space to hold fattening pigs 3 of all sizes standing one at a time in the longitudinal extension of the chamber 1. The chamber 2 has two side walls 4 spaced sufficiently apart to prevent the pig 3 from turning around inside the chamber. At the opening of the chamber through which the pig 3 is entered two doors 5 are provided in a manner to be closed and opened by a piston-and-cylinder unit 6 operated for the purpose of closing the doors by a sensor means 7 mounted on the side of one of the walls. The sensor means comprises an arm 8 so arranged that it may be pushed in the lateral direction by the body of the pig, whereby the doors 5 close behind the pig 3. The operation of the piston-and-cylinder unit 6 to open the doors 5 will be described hereinafter.

At the top portion of the chamber 1 guide rails 9 are provided in the longitudinal direction of the chamber, one on either side thereof, and each guide rail 9 supports a sliding cylinder 10. The sliding cylinders 10 are interconnected by a cross bar 11 to which is attached a conical funnel 13 intended to receive the head 12 of the pig 3, the funnel attachment point to the cross bar being close to the wide end of the funnel. The wide end of the funnel 13 is turned towards the pig entrance opening of the chamber 1. On the upper surface of the funnel is provided a pivotable arm 14 one end of which may be pushed into the interior of the funnel 13 through an opening 15 until it abuts against the head of the pig. The extreme end of the pivotable arm supports an electrode 16. The movement of the pivotable arm is performed by a piston-and-cylinder unit 17 which is controlled by a sensor means 18 positioned inside the funnel 13 at the narrow end thereof and comprising a pressure plate. The pressure plate supports a second electrode 19 which is pressed inwards by the snout of the pig when the head thereof is in correct position inside the funnel, whereby the sensor means 18 is triggered off. The voltage applied on the electrodes 16 and 19 is variable.

When the sensor means 18 is triggered off, the piston-and-cylinder unit 17 actuates the pivotable arm 14 and moves it to a position wherein the arm end supporting the electrode 16 comes into contact with the head of the pig. This gives the pig an electric shock which lasts as long as the electrodes 16, 19 abut against the head of the pig. The pressure with which the electrodes abut against the head is determined by the force of the piston-and-cylinder unit 17 and the length of the abutment is determined by a time relay which in a manner known per se re-sets the piston-and-cylinder unit 17 for retraction of the electrode 16 from the head of the pig after lapse of a certain length of time, preferably about 10 seconds at a voltage of appr. 240 V. A piston-and-cylinder unit 20 is provided at the upper face of the framework 2 in order to effect displacement of the sliding cylinder 10 and thus the funnel 13. The piston-and-cylinder unit 20 is pivotably suspended at its one end in a cross-bar 21 whereas the opposite end thereof is attached to a lever 23 suspended in a stay 22 which is securely mounted on the framework, whereby the piston-and-cylinder unit via a link arm 24, one arm of which is articulated to the bar 11, is able to displace the sliding cylinders 10 and the funnel 13 closer to or away from the opening of the chamber 1 through which the pigs 3 are entered.

When the doors 5 have been closed, the piston-and-cylinder unit 20 move the funnel 13 in the direction towards the entrance door, whereby the head of the pig is forced into the correct position inside the funnel 13. Immediately upon completion of the anaesthetics-administering phase, the piston-and-cylinder unit 20 automatically returns the funnel 13 to its original position.

A lever 25 is provided on one of the side walls 2 of the chamber 1, said lever 25 actuating a hook 27 via an arm 26. The hook 27 retains a trap door 28 provided in the bottom wall of the chamber 1 in closed position. On the sliding cylinder 10 provided at the same side there is an arm 29 arranged, when the funnel 13 is moving towards its operative position, to pass by the lever 25 without actuating the latter as the arm is arranged to recede (get out of the way) in this direction but to carry the lever along when the funnel is returning to its original position, such that the hook 27 no longer retains the trap door 28 in locked position, with the result that the trap door falls down and the pig 3 standing on the door falls down on a reception chute disposed underneath the door 28 for conveyance of the pig to the location where it is suspended and killed. The trap door 28 and the hook 27 are spring-loaded and they therefore return to their respective original positions as soon as the arm 29 has passed by the lever 25 and the pig has fallen down. When the trap door 28 returns to its closed position a sensor means 31 is activated which is coupled to the piston-and-cylinder unit 6 to open the doors 5.

The invention is not limited to the embodiment illustrated and described in the aforegoing but various modifications are possible within the scope of the appended claims. The voltage between the electrodes and the length of time during which current flows may vary. The mechanical transmission means and pivotal arrangements may be constructed in a variety of ways within the scope of the invention.

What I claim is:

1. An improved device to render pigs unconscious in an automatic manner, said device comprising a chamber arranged to hold one pig at a time, and having a closable opening through which said pig enters, and a closable opening through which said pig exits said chamber, the improvement comprising a conical funnel in said chamber arranged for displacement towards and away from the head of said pig, means for moving said funnel toward and way from said head of said pig, the displacement in the direction towards the head of said pig for receiving said head therein being effected when said pig entrance opening is closed, said funnel comprising a sensor means, a first electrode on said sensor means, a live second electrode on said conical funnel, said first electrode being energized upon its contact with said pig's head and said sensor means cooperates with said second live electrode whereby upon activation of said sensor means said second live electrode is brought into contact with said pig's head, thus rendering said pig unconscious, said moving means comprising means for retracting said conical funnel from the pig's head after lapse of a predetermined length of time, and means cooperating with said funnel to effect automatic opening of said pig exit to remove said pig from said chamber after said predetermined length of time has elapsed.

2. An improved device according to claim 1, comprising a trap door defining said opening through which said pig exits from said chamber, said trap door being disposed in the bottom of said chamber and disposed in a position so that said pig falls down from said chamber, and means to return said trap door to the closed position thereof as soon as said pig has fallen through said door.

3. An improved device according to claim 1, comprising guide means on said funnel, a system of levers arranged to operate said guide means, and said moving means comprises a piston-and-cylinder unit actuated by said system of levers to effect the displacement of said funnel.

* * * * *